United States Patent [19]

Kato

[11] Patent Number: 5,084,829

[45] Date of Patent: Jan. 28, 1992

[54] ROBOT MACHINING SYSTEM HAVING SUPPLY AND DISCHARGE CONVEYOR BELTS AND PALLETS

[75] Inventor: Hisao Kato, Inazawa, Japan

[73] Assignee: Mitsubishi Denki K.K., Tokyo, Japan

[21] Appl. No.: 463,584

[22] Filed: Jan. 11, 1990

[30] Foreign Application Priority Data

Jan. 12, 1989 [JP] Japan .................................. 1-3689

[51] Int. Cl.⁵ .............................................. B25J 9/00
[52] U.S. Cl. ...................................... 395/80; 364/468;
364/478; 414/225; 414/331; 198/340; 901/7;
395/904
[58] Field of Search ............... 364/513, 478, 468, 200,
364/900; 414/225, 226, 331; 198/340; 901/7

[56] References Cited

U.S. PATENT DOCUMENTS

| | | | |
|---|---|---|---|
| 3,306,471 | 2/1967 | Devol | 901/7 |
| 3,952,388 | 4/1976 | Hasegawa et al. | 29/33 P |
| 4,084,684 | 4/1978 | Skinner, II | 198/467 |
| 4,359,815 | 11/1982 | Toyoda | 29/568 |
| 4,430,717 | 2/1984 | Senda et al. | 364/474 |
| 4,543,702 | 10/1985 | Wada | 29/434 |
| 4,669,168 | 6/1987 | Tamura et al. | 29/429 |
| 4,679,149 | 7/1987 | Merz | 364/478 |
| 4,685,850 | 8/1987 | Ohta et al. | 414/225 |
| 4,722,653 | 2/1988 | Williams et al. | 414/222 |
| 4,821,198 | 4/1989 | Takeuchi et al. | 364/468 |
| 4,821,402 | 4/1989 | Kosho et al. | 29/568 |
| 4,831,540 | 5/1989 | Hesser | 364/468 |
| 4,835,711 | 5/1989 | Hutchins et al. | 364/513 |
| 4,930,086 | 5/1990 | Fukasawa | 364/468 |
| 5,006,996 | 4/1991 | Naramura et al. | 364/478 |

FOREIGN PATENT DOCUMENTS

| | | |
|---|---|---|
| 3013398 | 10/1981 | Fed. Rep. of Germany . |
| 88273 | 5/1984 | Japan . |
| 62-39130 | 2/1987 | Japan . |
| 62-39131 | 2/1987 | Japan . |
| 62-53288 | 3/1987 | Japan . |
| 62-63038 | 3/1987 | Japan . |
| 62-68248 | 3/1987 | Japan . |
| 62-193755 | 8/1987 | Japan . |
| 62-218058 | 9/1987 | Japan . |
| 63-57154 | 3/1988 | Japan . |
| 63-74556 | 4/1988 | Japan . |
| 1-199755 | 8/1989 | Japan . |

Primary Examiner—Michael R. Fleming
Assistant Examiner—Roger S. Joyner
Attorney, Agent, or Firm—Sughrue, Mion, Zinn, Macpeak & Seas

[57] ABSTRACT

A work forming apparatus of this invention includes a robot which operates within a predetermined operational range, a working machine with a chuck, a supply loop, a discharge loop, supply pallets for accommodating material works, and discharge pallets for accommodating formed works. An information card is attached to each pallet so as to record work information relative to the corresponding pallet. Two information processing heads are provided for effecting reading and writing of work information at a work supplying section and a work discharging section, respectively. A control device provided for controlling all the above elements inputs a production command so that a specified hand is automatically selected and the robot employs the hand to take the required material works alone out of the supply pallets which are being circulated on the supply loop. The material works are then formed and discharged by the discharge pallet.

11 Claims, 3 Drawing Sheets

ROBOT MACHINING SYSTEM HAVING SUPPLY AND DISCHARGE CONVEYOR BELTS AND PALLETS

BACKGROUND OF THE INVENTION

1. Field of the Invention

The present invention relates to a work forming apparatus for forming many kinds of works in units of small lots by means of an industrial robot.

2. Description of the Related Art

Various kinds of work forming apparatus employing industrial robots have heretofore been proposed. However, any of the proposed work forming apparatus are designed for use in mass-production applications. If such a conventional apparatus is applied to the working of many kinds of (products), an expanded space is required for installation of a work conveying line. Particularly in the case of small-lot production of many kinds of products, the efficiency of space and cost deteriorates to an impracticable extent.

SUMMARY OF THE INVENTION

It is, therefore, an object of the present invention to provide a work forming apparatus which makes it possible to solve the above-described problems and which is capable of efficiently effecting small-lot production of many kinds of works (products).

To achieve the above object, in accordance with the present invention, there is provided a work forming apparatus which is provided with a robot which is driven within a predetermined operational range, working means including a chuck located within the operational range, and a supply loop. The supply loop includes a conveying closed loop including a work supplying section located within the operational range, a discharge loop constituted by a conveying closed loop including a work discharging section located within the operational range, a plurality of supply pallets disposed on the supply loop for respectively accommodating material works of different kinds, a plurality of discharge pallets disposed on the discharge loop for respectively accommodating formed works of different kinds. A plurality of information recording are respectively provided on the plurality of supply pallets and the plurality of discharge pallets. Each of the information recording means being arranged to record work information relative to the corresponding pallet. A first information processing head is disposed at the work supplying section for reading the required work information from the information recording means provided on the one of the supply pallets that is located at the work supplying section. The processing head also writes the latest work information to the information recording means. A second information processing head is disposed at the work discharging section for reading the required work information from the information recording means provided on the one of the discharge pallets that is located at the work discharging section. This second processing head also writes the latest work information to the information recording means. Control means is arranged to input a production command, circulate the work supplying section and the work discharging section so that a particular supply pallet which accommodates material works of the kind according to the production command and a particular discharge pallet which accommodates formed works of the kind according to the production command are located respectively at the work supplying section. The control means also circulates the work discharging section on the basis of the work information read by the first information processing head and the second information processing head, and drives the robot to take the required material work out of the supply pallet located at the work supplying section and attach the material work to the chuck of the working means. The control means causes the working means to form the attached material work, drive the robot to remove the formed work from the chuck of the forming means, and accommodates the removed work in the discharge pallet located at the work discharging section.

Further objects, features and advantages of the present invention will become apparent from the following detailed description of embodiments of the present invention with reference to the accompanying drawings.

BRIEF DESCRIPTION OF THE INVENTION

DESCRIPTION OF THE PREFERRED EMBODIMENT

An embodiment of the present invention is explained below with reference to the accompanying drawings.

Figure 1:
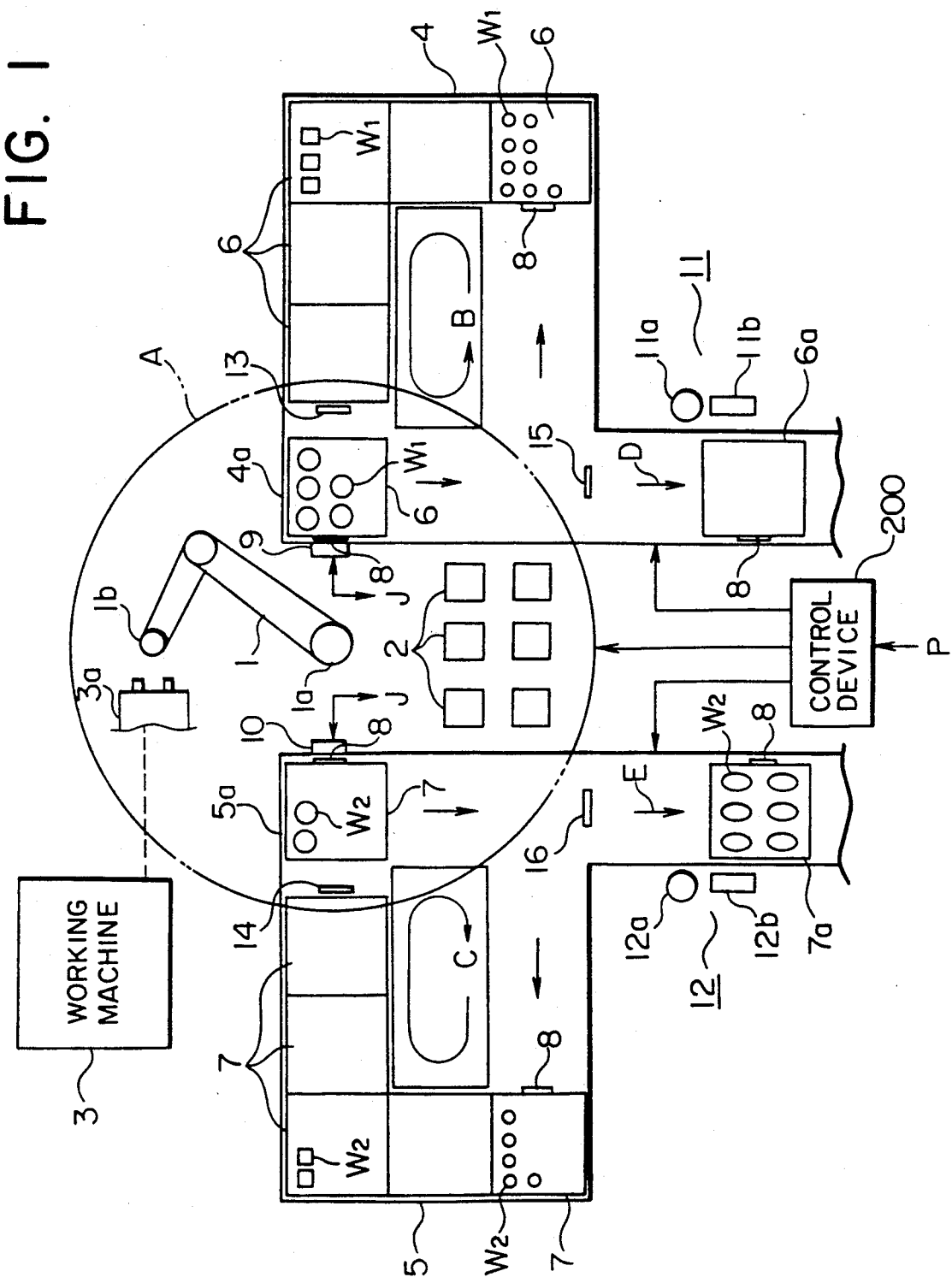
FIG. 1 is a diagrammatic plan view showing one embodiment of a work forming apparatus according to the present invention.

Referring to FIG. 1, a robot 1 is a general industrial robot of a multi-articulated arm type which operates about a rotational axis 1a, and is arranged to operate within a predetermined operational range A. A distal end 1b is provided with, for example, a hand sensor (not shown).

A plurality of hands 2 are disposed at a location within the operational range A so that they can be selectively attached to the distal end 1b of the robot 1 in accordance with the configuration and size of each work. A chuck 3a, which serves as the work holding portion of a working machine 3 such as a numerically controlled lathe, is also disposed at a location within the operational range A.

In the vicinity of the robot 1, there are provided a supply loop 4 and a discharge loop 5 each of which comprises a conveying closed loop such as a conveyor or the like. The supply loop 4 and the discharge loop 5 respectively include a work supplying section 4a and a work discharging section 5a within the operational range A.

A plurality of supply pallets 6 and a plurality of discharge pallets 7 are disposed as illustrated on the supply loop 4 and the discharge loop 5, respectively. The supply pallets 6 and the discharge pallets 7 are circulated by the supply loop 4 and the discharge loop 5 in the directions indicated by arrows B and C, respectively. Each of the supply pallets 6 is, as required, provided with a work positioning member (not shown) so that it can accommodate a plurality of material works $W_1$ of a predetermined kind alone. Similarly, each of the display pallets 7 is, as required, provided with a work positioning member (not shown) so that it can also accommodate a plurality of formed works $W_2$ of a predetermined kind alone.

The material works $W_1$ of each kind which differs in configuration or size are accommodated in the supply pallet 6 which correspond to that kind of work $W_1$. Similarly, the formed works $W_2$ are accommodated in the corresponding discharge pallets 7. FIG. 1 representatively shows some of the material works $W_1$ and the formed works $W_2$ for ease of explanation.

An information card 8, made from a magnetic information recording card or the like, is attached to one side of each of the supply pallets 6 and the discharge pallets 7 for the purpose of recording work information J, that is, the pallet number, the kind of work (or name of the kind of product), the number of works accommodated, the arrangement of the works accommodated (whether horizontal or vertical) and the like.

Information processing heads 9 and 10 are disposed at the work supplying section 4a and the work discharging section 5a, respectively. The information processing head 9 is arranged, as required, to read the work information J from and write the latest work information J to the information card 8 which is attached to the supply pallet 6 which is located at the work supplying section 4a. The information processing head 10 is similarly arranged, as required, to read the work information J from and write the latest work information J to the information card 8 which is attached to the discharge pallet 7 which is located at the work discharging section 4a.

A work supply command display section 11, which is provided in the vicinity of the supply loop 4, comprises a command lamp 11a for indicating that the material works $W_1$ corresponding to a particular production command P have run short on the supply loop 4 as well as an indicator lamp 11b for indicating the kind of work $W_1$ which has run short.

A pallet supply command display section 12, which is provided in the vicinity of the discharge loop 5, comprises a command lamp 12a for indicating that a particular discharge pallet 7 for accommodating the formed works $W_2$ of a specific kind is not found on the discharge loop 5 as well as an indicator lamp 12b for indicating the kind of works $W_2$ which correspond to the discharge pallet 7 required.

Stoppers 13 and 14 are provided at locations respectively immediately before the work supplying section 4a and the work discharging section 5a with respect to the direction of circulation of the pallets 6 and 7. The stoppers 13 and 14 are arranged, as required, to move up and down so that the supply pallets 6 and the discharge pallets 7 are sequentially positioned one by one at the work supplying section 4a and the work discharging section 5a.

A stopper 15, which is similar to the stopper 13, is provided at one corner of the supply loop 4, while a stopper 16, which is similar to the stopper 14, is provided at one corner of the discharge loop 5. The stopper 15 is arranged to discharge an empty supply pallet 6a from the supply loop 4, while the stopper 16 is arranged to discharge from the discharge loop 5 a particular discharge pallet 7a which has accommodated a predetermined number of formed works $W_2$.

A control device 200 is connected to the robot 1, a working machine (not shown), the supply loop 4, the discharge loop 5 and so on.

Figure 2:
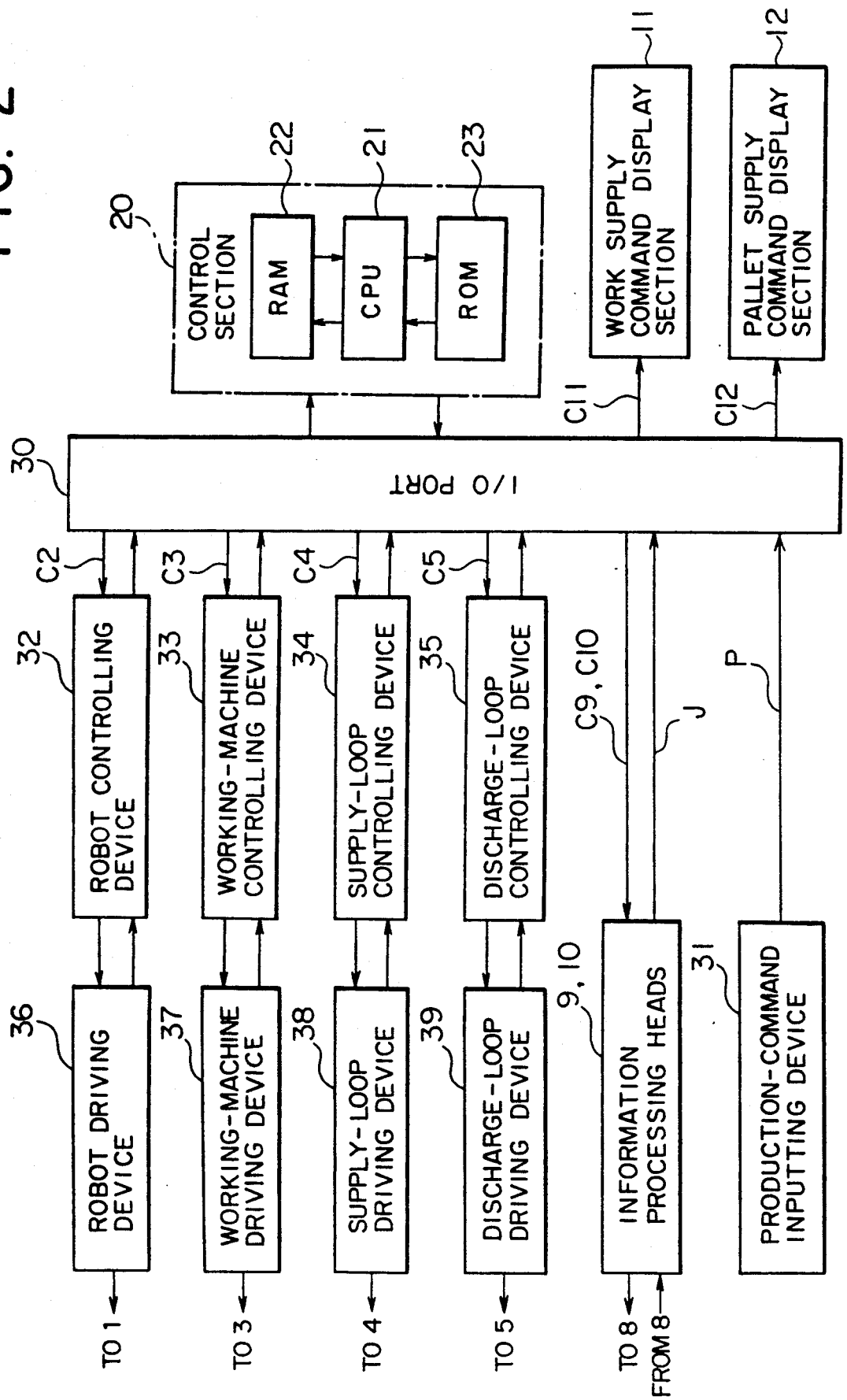
FIG. 2 is a block diagram showing the internal structure of a control device for use in the embodiment.

FIG. 2 is a block diagram showing the internal structure of the control device 200. The control device 200 includes a control section 20 for controlling the drive sequence of all the elements of the work forming apparatus on the basis of the production command P and the work information J. This control section 20 is provided with a CPU 21 as well as a RAM 22 and a ROM 23 which are connected to the CPU 21.

Connected to an I/0 port 30 which serves as an interface for the control section 20, are a production-command inputting device 31 comprising a keyboard terminal or the like, a robot controlling device 32, a working-machine controlling device 33, a supply-loop controlling device 34 and a discharge-loop controlling device 35, in addition to the information processing heads 9 and 10, the work supply command display section 11 and the pallet supply command display section 12.

The respective control devices 32-35 are connected to a robot driving device 36 for controllably driving the robot 1, a working-machine driving device 37 for controllably driving the working machine 3, a supply-loop driving device 38 for controllably driving the supply loop 4 and a discharge-loop driving device 39 for controllably driving the discharge loop 5.

Figure 3:
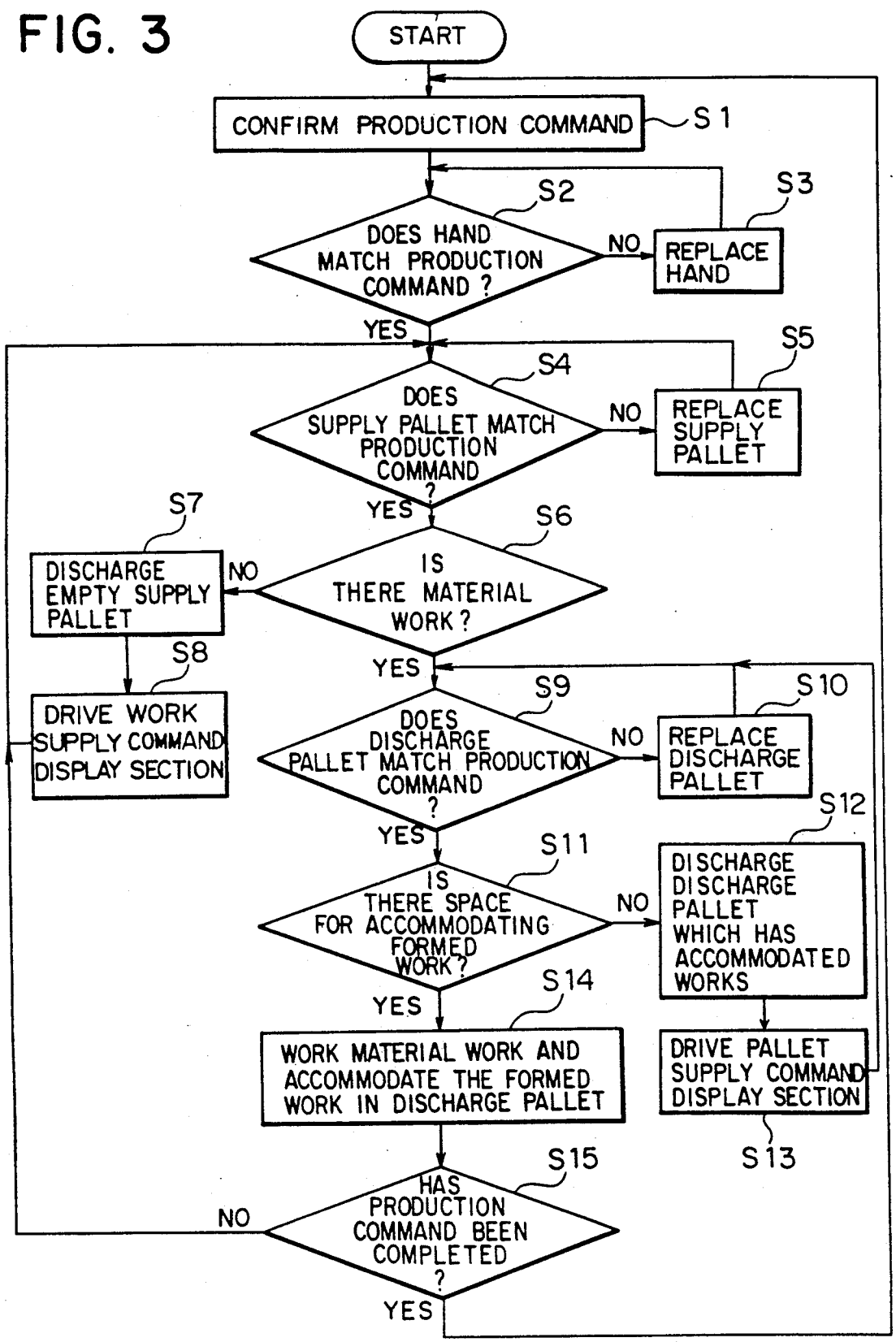
FIG. 3 is a flow chart which serves to illustrate the operation of the embodiment.

Next, the operation of this embodiment is explained below with reference to the flow chart of FIG. 3 which shows the control sequence of the control section 20.

For the sake of explanation, it is assumed that the required sequence program for each kind of work is beforehand stored in the ROM 23 of the control section 20, that a plurality of supply pallets 6 each of which accommodates a plurality of material works $W_1$ of a predetermined kind alone are disposed on the supply loop 4, and that a plurality of empty discharge pallets 7 for accommodating the formed works $W_2$ of different kinds are disposed on the discharge loop 5.

First of all, the production-command inputting device 31 is operated to store the production command P based on a particular production scheme into the RAM 22 of the control section 20. The production command P contains the kind, the number and so on of works to be produced.

The control section 20 confirms the input production command P (Step S1), and fetches a sequence program corresponding to the production command P from the ROM 23 to sequentially output control commands C2-C5 to the respective control devices 32-35 and control commands C9-C12 to the information processing heads 9 and 10 and the supply command display sections 11 and 12, respectively. On the basis of these control commands, the robot 1, the working machine 3, the loops 4 and 5, the information processing heads 9 and 10 and the work supply command display section 11 and the pallet supply command display section 12 are driven in accordance with the sequence program corresponding to the production command P as follows.

First of all, on the basis of a signal supplied from the hand sensor (not shown), a decision is made as to whether the hand 2 attached to the distal end 1b of the robot 1 matches the production command P (Step S2). If the answer is "NO", the control command C2 is output to the robot controlling device 32 to drive the robot 1, thereby replacing the hand 2 with a different hand 2 which matches the production command P (Step S3). Then, the process returns to Step S2.

If it is determined in Step S2 that the hand 2 attached to the distal end 1b of the robot 1 matches the production command P, a decision is made as to whether the supply pallet 6, that is, the kind of material work $W_1$ located at the work supplying section 4a on the supply loop 4, matches the production command P (Step S4). At this time, the work information J stored on the information card 8 of the supply pallet 6 located at the work supplying section 4a is read out by the information processing head 9 and input to the control section 20.

If it is determined in Step S4 that the kind of work contained in the work information J does not match the production command P, the control command C4 is output to the supply-loop controlling device 34 to cause the stopper 13 to move down and simultaneously to drive the supply loop 4 in the direction of arrow B. In this manner, the next supply pallet 6 is located at the work supplying section 4a to perform the replacement of the current supply pallet 6 by the next supply pallet 6 (Step S5). Then, the process returns to Step S4. Incidentally, Steps S4 and S5 are repeated until the desired supply pallet 6 is confirmed.

If it is determined in Step S4 that the supply pallet 6 located at the work supplying section 4a matches the production command P, a decision is made as to whether at least one material work $W_1$ is accommodated in the supply pallet 6 on the basis of the number of accommodated works which is contained in the work information J (Step S6).

If no material work $W_1$ is found, the control command C4 is output to the supply-loop controlling device 34 to drive the supply loop 4 and simultaneously to cause the stopper 15 to move down, thereby discharging the empty supply pallet 6a from the supply loop 4 in the direction indicated by an arrow D (Step S7). In addition, the control command C11 is output to drive the work supply command display section 11 (Step S8). After the process has requested the supply of new material works $W_1$ which match the production command P, the process returns to Step S4. At this time, the command lamp 11a is made to light and the indicator lamp 11b is made to indicate the kind of work $W_1$ specified. An operator may dispose on the supply loop 4 a new supply pallet 6 which accommodates the required material works $W_1$, while viewing the display section 11.

In Step S6, if it is confirmed that at least one material work $W_1$ which coincides with the kind specified by the production command P is present, then the work information J is read from the information card 8 attached to the discharge pallet 7 located at the work discharging section 5a on the discharge loop 5 by means of the information processing head 10. Then, a decision is made as to whether the discharge pallet 7 matches the kind of work specified by the production command P (Step S9).

If the discharge pallet 7 does not match the production command P, the control command C5 is output to the discharge-loop controlling device 35 to cause the stopper 14 to move down and simultaneously to drive the discharge loop 5 in the direction of arrow C, thereby disposing the next discharge pallet 7 at the work discharging section 5a. In this manner, the replacement of the current discharge pallet 7 by the next discharge pallet 7 is performed (Step S10), and the process returns to Step S9. These steps S9 and S10 are repeated until the discharge pallet 7 for the desired kind of work is confirmed.

If it is determined in Step S9 that the discharge pallet 7 located at the work discharging section 5s matches the production command P, a decision is made as to whether a space for accommodating at least one formed work $W_2$ is present in the discharge pallet 7 on the basis of the number of accommodated works which are contained in the work information J (Step S11).

If no accommodation space for the formed work $W_2$ is found, it is determined that one accommodating cycle for this discharge pallet 7 has been completed. Then, the control command C5 is output to the discharge-loop controlling device 35 to drive the discharge loop 5 in the direction of arrow C and simultaneously to cause the stopper 16 to move down, thereby discharging that discharge pallet 7a, which accommodates a predetermined number of formed works $W_2$, from the discharge loop 5 in the direction of arrow E (Step S12). In addition, the control command C12 is output to drive the pallet supply command display section 12 (Step S13). The process then requests that an empty discharge pallet 7 which matches the production command P be supplied, and the process returns to Step S9. The operator may dispose on the discharge loop 5 the required empty discharge pallet 7 while viewing the pallet supply command display section 12.

If it is confirmed in Step S11 that there is a accommodation space for at least on formed work $W_2$ within the discharge pallet 7, the control command C2 is output to the robot controlling device 32, thereby driving the robot 1. The robot 1 takes the material works $W_1$ out of the supply pallet 6 in a predetermined sequence and secures them to the chuck 3a of the working machine 3. In the meantime, the control command C3 is output to the working-machine controlling device 33 and the chuck 3a is, for example, rotated to perform work upon the secured material works $W_1$. After completion of the working cycle, the robot 1 is again driven by the control command C2 to accommodate and arrange the formed works $W_2$ within the discharge pallet 7 in a predetermined sequence (Step S14).

During the above step S14, the control commands C9 and C10 are output to the respective information processing heads 9 and 10 and the number of works accommodated in each of the supply pallet 6 and the discharge pallet 7 is written to the information card 8 of the corresponding pallet as the latest work information J.

Finally, it is determined whether or not the working cycle according to the production command P has been completed (Step S15). If the working cycle has been completed, the process returns to Step S1; otherwise the process returns to Step S4.

In this manner, merely by inputting the production command P from the production-command inputting device 31, a particular hand 2, which is automatically selected in accordance with the production command P, is employed to take the required material works $W_1$ separately out of the various supply pallets 6 which are being circulated on the supply loop 4. The selected works $W_1$ are then formed and discharged as described above.

During the above process, the supply loop 4 continues to circulate the supply pallets 6 until the required material works $W_1$ run short. If the material works $W_1$ run short, the corresponding empty pallet 6a is moved out of the supply loop 4. In the meantime, the discharge loop 5 continues to circulate the discharge pallets 7 until their accommodation spaces for the formed works $W_2$ run short. When the working of the material works $W_1$ according to the production command P has been completed, that is, when a accommodation space for particular formed works $W_2$ runs short, the corresponding discharge pallet 7a together with the formed works $W_2$ accommodated therein is moved out of the discharge loop 5.

In consequence, since efficient accommodation of many kinds of works is realized within the minimum required loop space, it is possible to prevent an excessive number of formed works $W_2$ from being prepared, and it is also possible to solve the problem that the material works $W_1$ may run short during a working cycle. Accordingly, efficient production can be carried out as scheduled and an apparatus for small-lot production of many kinds of works can be implemented even within a limited space.

In addition, each time the command lamp $11a$ or $12a$ lights, an operator has only to place the required supply pallet 6 which accommodates specific material works $W_1$ on the supply loop 4 or to place an empty discharge pallet 7 on the discharge loop 5. Accordingly, the operator needs no technical knowledge and the burden imposed on him is lightened, and so the operator can proceed with his operation without operational error.

Moreover, when a change in the kind of work is needed, the required supply pallet 6 and the associated discharge pallet 7 alone may be replaced. Accordingly, the cost of the entire production facility can be reduced.

What is claimed is:

1. A work forming apparatus comprising:
  a robot which is driven within a predetermined operational range;
  working means including a chuck located within said operational range;
  a supply loop constituted by a conveying closed loop including a work supplying section located within said operational range;
  a discharge loop constituted by a conveying closed loop including a work discharging section located within said operational range;
  a plurality of supply pallets disposed on said supply loop for accommodating different kinds of material works, said supply loop conveying said supply pallets to and from said work supplying section;
  a plurality of discharge pallets disposed on said discharge loop for accommodating different kinds of formed works, said discharge loop conveying said discharge pallets to and from said work discharging section;
  each of said supply pallets and said discharge pallets having information recording means thereon, each of said information recording means being arranged to record work information relative to a corresponding pallet including any latest work information;
  a first information processing head disposed at said work supplying section for reading required work information from the information recording means provided on a one of said supply pallets located at said work supplying section and writing the latest work information to said information recording means;
  a second information processing head disposed at said work discharging section for reading said work information from the information recording means provided on a one of said discharge pallets located at said work discharging section and writing the latest work information to said information recording means; and
  control means comprising means for inputting a production command, means for circulating said supply loop and said discharge loop so that a particular supply pallet which accommodates material works of a kind according to said production command and a particular discharge pallet which accommodates formed works of a kind according to said production command are located respectively at said work supplying section and said work discharging section on the basis of work information on said supply pallet read by said first information processing head and work information on said discharge pallet read by said second information processing head, means for driving said robot to take a required material work out of said supply pallet located at said work supplying section and attaching said material work to said chuck of said working means, means for causing said working means to form said attached material work, means for driving said robot to remove a formed work from said chuck of said working means, and means for positioning said removed work in said discharge pallet located at said work discharging section.

2. An apparatus according to claim 1 further comprising a plurality of hands disposed within the operational range of said robot and selectively attached to a distal end of said robot for holding different kinds of material works and different kinds of formed works, said control means further comprising: means for selecting one of said hands according to said production command and means for attaching said selected hand to the distal end of said robot by said control means.

3. An apparatus according to claim 1 further comprising: means for sensing when the material works of the kind according to said production command have run short and work supply command display means for indicating a shortage of said material works.

4. An apparatus according to claim 1 further comprising: means for sensing when said discharge pallets for accommodating said formed works have run short and pallet supply command display means for indicating a shortage of said discharge pallets.

5. An apparatus according to claim 1 wherein said information recording means is made from a magnetic card.

6. A work forming apparatus comprising:
  a robot which is driven within a predetermined operational range;
  working means including a chuck located within said operational range;
  a supply loop constituted by a conveying closed loop including a work supplying station located within said operational range;
  a discharge loop constituted by a conveying closed loop including a work discharging station located within said operational range;
  a plurality of supply pallets disposed on said supply loop for accommodating different types of material works, each of said supply pallets holding a plurality of material works, said supply loop conveying said supply pallets to and from said work supplying station;
  a plurality of discharge pallets disposed on said discharge loop for accommodating different kinds of formed works, each of said discharge pallets holding a plurality of formed works, said discharge loop conveying said discharge pallets to and from said work discharging station;
  each of said supply and discharge pallets having thereon information recording means for recording work information relative to a corresponding pallet including any latest work information;
  first and second information processing heads disposed at said work supply and discharge stations, respectively for reading and updating said work information stored on said information recording means;

control means for circulating said supply and discharge loops to position desired pallets at said work supply and discharge stations, respectively, based upon work information received from said first and second information processing heads.

7. The work forming apparatus of claim 6, wherein said work information includes at least a type and quantity of material works contained in a corresponding pallet.

8. The work forming apparatus of claim 6, wherein said control means continually circulates said supply loop until said first information processing head identifies a supply pallet containing a desired type of material work.

9. The work forming apparatus of claim 6, wherein said control means continually circulates said discharge loop until said second information processing head identifies a discharge pallet of a type capable of storing a designated formed work.

10. The work forming apparatus of claim 6, further comprising first and second stoppers positioned adjacent to said supply and discharge loops, said control means controlling said first stopper to automatically discharge empty supply pallets from said supply loop after said first information processing head determined that a supply pallet is empty.

11. The work forming apparatus of claim 10, wherein said control means controls said second stopper to automatically discharge a full discharge pallet from said discharge loop after said second information processing head determines that a discharge pallet is full.

* * * * *